United States Patent
Barton et al.

(10) Patent No.: US 8,576,990 B2
(45) Date of Patent: Nov. 5, 2013

(54) EMERGENCY CALL LOCALIZATION FOR IP-BASED TELEPHONY

(75) Inventors: Rudolf Barton, Oldenburg (DE); Reinhard Hausdorf, Ober-Ramstadt (DE); Markus Korporal, Duisburg (DE); Thomas Lentz, Gaertringen (DE); Gerd Orians, Fraenkisch-Crumbach (DE); Roland Schott, Bad Nauheim (DE); Franz Tenambergen, Mettingen (DE)

(73) Assignees: International Business Machines Corporation, Armonk, NY (US); Deutsche Telekom AG, Bonn (DE)

( * ) Notice: Subject to any disclaimer, the term of this patent is extended or adjusted under 35 U.S.C. 154(b) by 1721 days.

(21) Appl. No.: 11/958,846

(22) Filed: Dec. 18, 2007

(65) Prior Publication Data
US 2008/0152092 A1 Jun. 26, 2008

(30) Foreign Application Priority Data
Dec. 20, 2006 (DE) .......................... 10 2006 061521

(51) Int. Cl.
*H04M 11/04* (2006.01)

(52) U.S. Cl.
USPC .................... 379/45; 379/38; 379/39; 379/49

(58) Field of Classification Search
USPC ...................................... 379/37–51
See application file for complete search history.

(56) References Cited

U.S. PATENT DOCUMENTS

| | | | |
|---|---|---|---|
| 7,389,354 B1* | 6/2008 | Sitaraman et al. | 709/229 |
| 7,742,578 B1* | 6/2010 | Klesper et al. | 379/45 |
| 2006/0193447 A1* | 8/2006 | Schwartz | 379/45 |
| 2007/0121798 A1* | 5/2007 | Croy et al. | 379/37 |
| 2008/0075235 A1* | 3/2008 | Russikoff | 379/45 |
| 2010/0020942 A1* | 1/2010 | Olshansky et al. | 379/45 |

OTHER PUBLICATIONS

Abbott, Nadine; Alternatives for Providing Routing and Location Information to support Emergency Calling from IP Enterprises; Telcordia Technologies; NENA Technical Information Document, XX, XX,Oct. 3, 2003, Seiten 1-16; XP-002323684.

(Continued)

*Primary Examiner* — Duc Nguyen
*Assistant Examiner* — Ibraham Sharifzadeh
(74) *Attorney, Agent, or Firm* — Schmeiser, Olsen & Watts, LLP; John R. Pivnichny (57) ABSTRACT

A method and system for localizing an initial point of an Internet Protocol (IP)-based telephone call that is an emergency call. A Telephony Application Server (TAS)-Proxy receives the emergency call originating from a Voice-over-IP (VoIP) subscriber. An emergency call application transmits to a replication database a request for emergency call data for identifying an initial point of the emergency call. The replication database determines the emergency call data from the IP address of the VoIP and transmits the emergency call data to the emergency call application. The emergency call applications sends the emergency call data to the TAS-Proxy. The TAS-Proxy routes the emergency call, and sends an Emergency ID of the emergency call data, to a local responsible Public Safety Answering Point. The local responsible Public Safety Answering Point can use a reference in the Emergency ID to technical data to locate the initial point of the emergency call.

18 Claims, 3 Drawing Sheets

(56) References Cited

OTHER PUBLICATIONS

NENA VOIP-Packet Technical Committee; Interim VoIP Architecture for Enhanced 9-1-1 Services (i2); NENA 08-001, Issue 1 [Online],Dec. 6, 2005, Seiten 1-181; XP-00247966; Gefunden im Internet: URL: http://www.nena.org/media/File/NENA_08-001_V1_12-06-05_1.pdf> [gefunden am May 7, 2008] Seite 14-Seite 35; Seite 59-Seite 81.

DSL.net™; Duet® Voice and Data; DSL.net Customer Notification of 911 Service Capabilities for Voice over Internet Protocol Customers; Retrieved from the Internet: < URL: http://www.dsl.net/legal/Customer_Notification_$_{of}$_$_{E911}$_Service_Capabilities_Description.pdf >; [Retrieved Dec. 17, 2007]; 1 page.

3GPP™; 3GPP TS 23.167 V7.3.0 (Dec. 2006); Technical Specification; 3rd Generation Partnership Project; Technical Specification Group Services and System Aspects; IP Multimedia Subsystem (IMS) emergency sessions (Release 7); 34 pages.

* cited by examiner

EMERGENCY CALL LOCALIZATION FOR IP-BASED TELEPHONY

FIELD OF THE INVENTION

The present invention concerns a method and emergency call system for localizing the initial point of an IP-based emergency call.

BACKGROUND OF THE INVENTION

Due to their cellular structure, the current location of a caller making a telephone connection with a mobile telephone is possible in the mobile telephone networks using the registers managed in the base stations of the networks, at least in the form of information about the cell in which the caller or the mobile telephone used for the call is located. Currently, however, an increase in Internet Protocol (IP) telephony is apparent. It must be assumed that IP telephony in the medium or long term will achieve a greater importance than conventional landline telephony to date in the public telephone network or PSTN (Public Switched Telephone Network) or even replace it. Up to now, DSL connections which are primarily used for IP telephony are mostly still coupled to analogue or ISDN landline connections. In this respect, a localization of callers who use the IP telephony is usually the case using the location information for the respective analogue or ISDN landline connection. It is also often the case that IP telephony providers exclude calls to emergency telephone numbers from the IP-based route using a corresponding configuration of the routers installed for their customers, and calls to these emergency numbers are made using the normal analogue or ISDN connection.

However, in the business area today, there are already a large number of IP connections provided with fixed IP address without associated landline connection; i.e. without associated ITU-T E.164 telephone number. With the increasing transition to IP telephony, an associated ITU-T E.164 location number for DSL broadband connections will therefore more and more frequently be dispensed with. The nomadic usage of IP telephony (also VoIP telephony) is also increasing where this is being used by means of VoIP capable end devices; for example WLAN capable mobile telephones. Mechanisms for localizing the initial point of an IP-based emergency call, however, do not engage for the nomadic usage of IP telephony and its use via broadband connections without associated landline connection.

In many countries to date, there are no final legal regulations for this type of usage with respect to the existing requirement for safety reasons for call localization for emergency calls. With the existing legal regulations, there is exclusive reliance on the assistance of the caller who should give the corresponding location information to the Public Safety Answering Point himself. However, under certain circumstances this can no longer be possible in a life-threatening situation or for a person with extreme health problems. On the other hand, however, technical solutions which completely solve the above mentioned problems pertaining to localizing the initial point of an IP-based emergency telephone call are basically not known to date.

SUMMARY OF THE INVENTION

The present invention provides a method for localizing an initial point of an Internet Protocol (IP)-based telephone call, said method comprising:

receiving, by a Telephony Application Server (TAS)-Proxy, the IP-based telephone call originating from a Voice-over-IP (VoIP) subscriber, said IP-based telephone call characterized by an IP address of the VoIP subscriber and by a called telephone number of an entity being called;

ascertaining, by the TAS-Proxy, that the IP-based telephone call is an emergency call;

by an emergency call application in response to said ascertaining, transmitting to a replication database a request for emergency call data configured to be used for identifying an initial point of the emergency call, said request comprising the IP address;

by a software application comprised by the replication database in response to the replication database having received the transmitted request, determining the emergency call data from the IP address followed by transmitting the emergency call data to the emergency call application, said emergency call data identifying a local responsible Public Safety Answering Point and comprising an Emergency ID that includes a reference to technical data that can be used to locate the initial point of the emergency call;

by the emergency call application in response to having received the transmitted emergency call data, sending the emergency call data to the TAS-Proxy; and by the TAS-Proxy in response to having received the emergency call data sent by the emergency call application, routing the IP-based emergency call to the local responsible Public Safety Answering Point and transmitting the Emergency ID to the local responsible Public Safety Answering Point for enabling the local responsible Public Safety Answering Point to locate the initial point of the emergency call.

The present invention provides an emergency call system comprising a Telephony Application Server (TAS)-Proxy, an emergency call application, and a replication database, said system configured to perform a method for localizing an initial point of an Internet Protocol (IP)-based telephone call, said method comprising:

receiving, by a Telephony Application Server (TAS)-Proxy, the IP-based telephone call originating from a Voice-over-IP (VoIP) subscriber, said IP-based telephone call characterized by an IP address of the VoIP subscriber and by a called telephone number of an entity being called;

ascertaining, by the TAS-Proxy, that the IP-based telephone call is an emergency call;

by an emergency call application in response to said ascertaining, transmitting to a replication database a request for emergency call data configured to be used for identifying an initial point of the emergency call, said request comprising the IP address;

by a software application comprised by the replication database in response to the replication database having received the transmitted request, determining the emergency call data from the IP address followed by transmitting the emergency call data to the emergency call application, said emergency call data identifying a local responsible Public Safety Answering Point and comprising an Emergency ID that includes a reference to technical data that can be used to locate the initial point of the emergency call;

by the emergency call application in response to having received the transmitted emergency call data, sending the emergency call data to the TAS-Proxy; and by the TAS-Proxy in response to having received the emergency call data sent by the emergency call application, routing the IP-based emergency call to the local responsible Public Safety Answering Point and transmitting the Emergency ID to the local responsible Public Safety Answering Point for enabling the local responsible Public Safety Answering Point to locate the initial point of the emergency call.

DETAILED DESCRIPTION OF THE INVENTION

Figure 1:
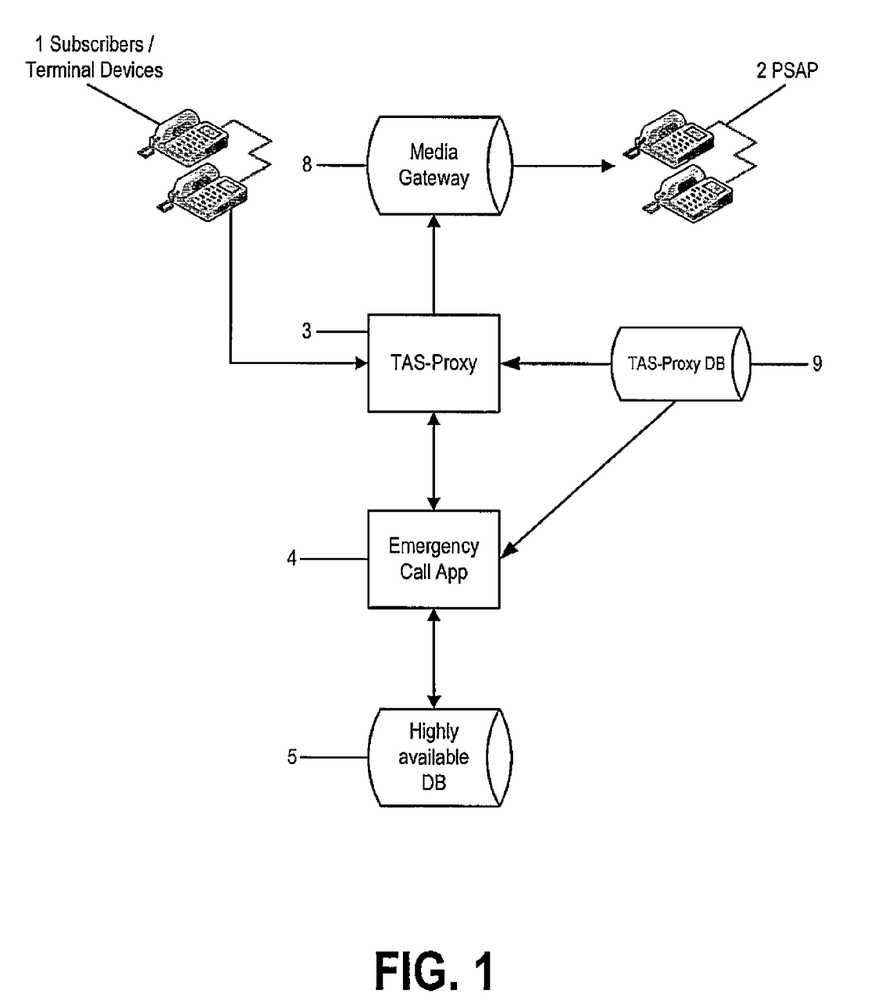
FIG. 1 shows parts of an emergency call system in accordance with embodiments of the present invention.

FIG. 1 shows parts of an emergency call system, in accordance with embodiments of the present invention. In FIG. 1, a terminal device or a telephone symbolizes one of several subscriber connections from subscribers 1 with a Voice-over-IP (VoIP) access.

The current, local responsible Public Safety Answering Point 2 is also symbolized by a terminal device for the previously mentioned symbolized subscriber connection. The terminal device(s) of this Public Safety Answering Point 2 is/are integrated in the PSTN (Public Switched Telephone Network) (not shown) and can be reached via a Media Gateway 8 for Internet Protocol (IP)-based telephone calls functioning as a bridge between the IP network with respect to the Internet and the PSTN. The telephone calls from the IP-based telephony Voice-over-IP subscribers 1 go to a Telephony Application Server (TAS)-Proxy 3 basically known from the current state of technology. The TAS-Proxy 3 designed for the IP telephony routes its incoming Voice-over-IP telephone calls via respective Gateways 8 to the subscribers called in the PSTN. In doing so, IP-based emergency telephone calls from the TAS-Proxy 3 are routed to the respective local Public Safety Answering Point responsible for the emergency telephone calls. An additional entity 4, 5 is connected to the TAS-Proxy 3 for providing assistance for responding to incoming emergency telephone calls at the TAS-Proxy 3. These entities 4, 5 are an emergency call application 4 and a highly available replication database 5 with stored technical data for locations of the Voice-over-IP subscribers 1 allocated to the IP addresses. The present invention performs a method described in FIG. 3.

Figure 3:
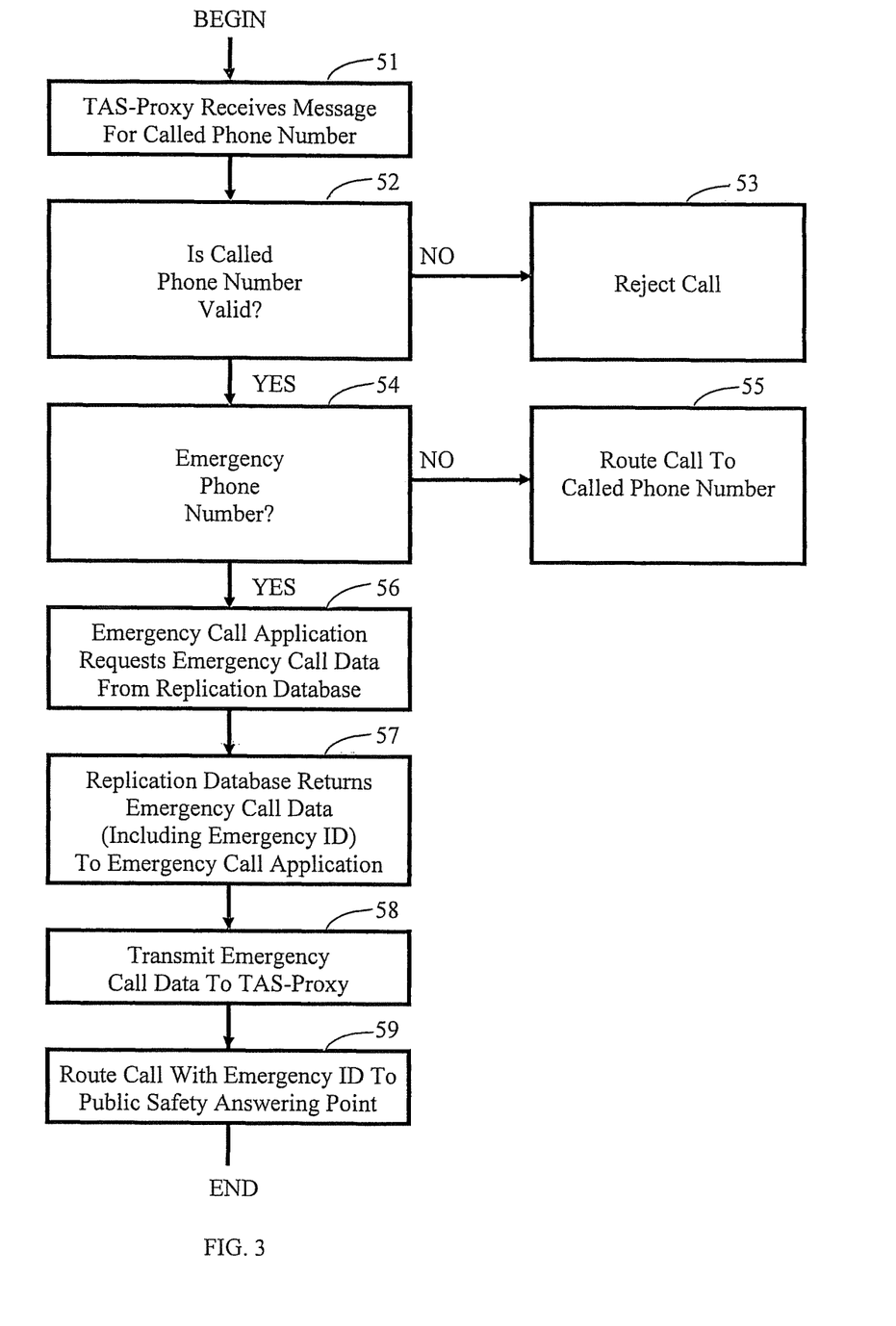
FIG. 3 is a flow chart describing a method for emergency call localization of an IP-based emergency call, in accordance with embodiments of the present invention.

FIG. 3 is a flow chart describing a method for emergency call localization of an IP-based emergency telephone call in steps 51-59, in accordance with embodiments of the present invention.

In step 51, the Voice-over-IP subscriber 1 sends an Invite message via a Session Initiation Protocol (SIP) client for a called telephone number which arrives at the TAS-Proxy 3.

Step 52 determines whether the called telephone number is valid. If step 52 determines that the called telephone number is not valid, then the telephone call is rejected in step 53. If step 52 determines that the called telephone number is valid, then in step 54 the TAS-Proxy 3 determines from emergency telephone number entries a database 9 to which the TAS-Proxy 3 is coupled whether the called telephone number is an emergency telephone number. The TAS-Proxy 3 may determine that the called telephone number is an emergency telephone number if the called telephone number matches an emergency telephone number entry in the database 9.

If step 54 determines that the called telephone number is not an emergency telephone number, then in step 55 the TAS-Proxy 3 routes telephone call to the called subscriber connection. However, if step 54 determines that the called telephone number is identified as an emergency telephone number, then the method transfers the further processing of the telephone call to the emergency call application 4 and proceeds to step 56.

In step 56, using the IP address of the Voice-over-IP subscriber 1 making the emergency telephone call received from the TAS-Proxy 3, a special request (SOAP—Simple Object Protocol Access request) for emergency call data is sent from the emergency call application 4 to the replication database 5.

In step 57, the replication database 5, designated here as LISA (Location Information Service Authority), determines the emergency call data using the IP address and returns the emergency call data to the emergency call application 4. The emergency call data includes: (1) the telephone number of the local, responsible Public Safety Answering Point 2; (2) the User Provided telephone number of the Voice-over-IP subscriber 1, for which the entity 4, 5 of the emergency call system and thus also the replication database are transparent; and (3) an Emergency ID in the form of a modified Network Provided telephone number.

The Emergency ID or the modified Network Provide telephone number contains: (1) a database reference to an entry with technical data for the location of the Voice-over-IP subscriber 1 making the emergency telephone call; and (2) a prefix to this reference which identifies the Network Provided ID as a modified Network Provided telephone number for the purpose of caller localization for emergency telephone calls. The Emergency ID is a telephone number which complies with the conventions of the telephone numbers in the PSTN. Therefore, the prefix in the Emergency ID has the form of an area code which is an area code exclusively reserved for this special purpose.

In step 58, the emergency call application 4 returns the emergency call data (received from the replication database 5) to the TAS-Proxy 3.

In step 59, the TAS-Proxy 3 sends an invite to the substituted B-subscriber (i.e., the recipient, namely the local, responsible Public Safety Answering Point 2) with transmission of the Emergency ID by routing this emergency telephone call to the subscriber connection of the Public Safety Answering Point 2 in the PSTN via the Media Gateway 8.

The emergency call system of FIG. 1 is a computing system that comprises one or more processors on which the software of the emergency call system may be executed to perform the methods of the present invention in a computer-implemented fashion. The emergency call system of FIG. 1 also comprises computer readable storage media for storing the software and data used for performing the methods of the present invention and for storing the input and ouput data used by the methods of the present invention. A computer readable storage medium or media with software of the emergency call system stored thereon is a computer program product.

Figure 2:
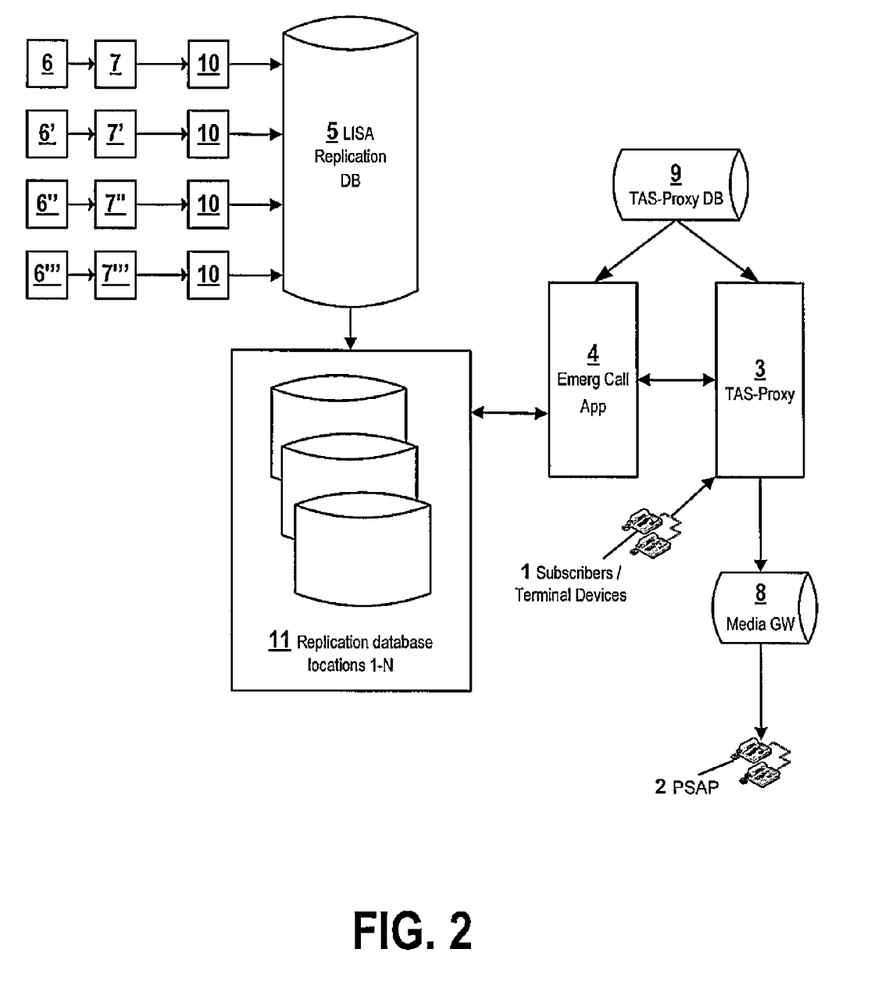
FIG. 2 shows a section of the emergency call system of FIG. 1 in more detail, in accordance with embodiments of the present invention.

FIG. 2 shows a section of the emergency call system of FIG. 1 in more detail, in accordance with embodiments of the present invention. A TAS platform with the TAS-Proxy 3 and the emergency call application 4 allocated to it as part of the additional entity 4, 5 can be seen. The emergency call application 4 has access to the highly available database 5, wherein the highly available database 5 comprises the technical location data, wherein the highly available database 5 is replicated at a plurality of locations (1 to N) 11, and wherein the plurality of locations (1 to N) 11 is separated from the replication database 5 as shown.

The replication database 5 is supplied with routing information comprised by the technical data, using corresponding channel(s) 10 by the Internet access systems 6, 7, namely Asymmetric Digital Subscriber Line (ADSL) and Asynchronous Transfer Mode (ATM)-NI Servers 6', servers for the Gbit Ethernet connection 6" and IP Servers 6''' of Order Management systems and associated Message Queue-Servers (MQ) 7', 7", 7''', and recalculates from this the technical location data giving access to the actual location or address information needed by the Public Safety Answering Points 2. The exchange of data between the above mentioned units and systems may occur using XML format.

Thus the present invention creates an emergency call system and an associated method which makes the localization of callers for calls made using IP telephony possible, in particular emergency calls, and also for nomadic use.

The above mentioned technical data describing the location of the caller are routing information pertaining to link components such as the Network Access Services (NAS) port (i.e. the port on the access server) and an associated slot, the virtual path used (VPI—Virtual Path Identifier), and the virtual channel used (VCI—Virtual Channel Identifier), wherein the link components are directly linked with the location from which the emergency call has been made.

The User Provided telephone number is only transparently transmitted with respect to the database query processed for the determination of technical data corresponding with the location of the Voice-Over-IP caller 1. However, this User Provided telephone number may not be a telephone number checked by the network. In this respect, the method of the present invention makes it possible according to its basic design to indeed localize the location and an associated physical subscriber connection used for the emergency call, but not to clearly identify the subscriber 1 or the identifier used by the subscriber 1 at the location concerned or the telephone number. In particular, the emergency call data and the technical data do not identify the subscriber 1 or the identifier used by the subscriber 1.

In one embodiment, the original unchecked User Provided telephone number in the TAS-Proxy 3 is substituted by a User Provided telephone number checked by the network. The TAS-Proxy 3 accesses its own database 9 using a customer profile stored at the provider for the respective subscriber in the course of setting up its Voice-Over-IP telephone numbers. At the same time, the User Provided telephone number substituted in the way described is transparently transmitted for processing steps and query processes for the determination of the emergency call data.

The following detailed processing sequence is designed according to an embodiment of the method of the present invention. First, an IP-based call from the TAS-Proxy 3 to an emergency call number together with the IP address of the Voice-Over-IP subscriber 1 making the emergency call are transmitted to a special emergency call application 4. This emergency call application 4 retrieves the corresponding emergency call data from the highly available replication database 5 using the IP address mentioned supra. The emergency call application 4 sends a special request containing the IP address of the Voice-Over-IP subscriber 1 making the emergency call to the replication database 5. The special request is a request for emergency call data. The replication database returns to the emergency call application 4, in response to this request, the requested emergency call data comprising current technical data corresponding to this IP address stored in the database allocated to the previously mentioned IP address for the location in the form of the reference. The emergency call data forming the emergency call identification or Emergency ID in this way are finally transmitted from the emergency call application 4 for further handling of the call to the TAS-Proxy 3 which makes the connection to the responsible Public Safety Answering Point 2 and transmits the Emergency ID to the responsible Public Safety Answering Point 2. Using the Emergency ID, the Public Safety Answering Point 2 can, if required, (because for example the caller can no longer be addressed) determine the location of the caller making the emergency call. For this purpose, stating the Emergency ID, the responsible Public Safety Answering Point 2 may make a corresponding query for example to a control centre service which retrieves the technical data for the location of the caller from the highly available replication database 5 using the Emergency ID and, with this data, receives access to the actual address and information via an operations database from which the control centre service then transmits this data to the Public Safety Answering Point 2.

The control centre service may be a central directly contactable point of the control centers of at least one region. In one embodiment, the TAS-Proxy 3 checks every incoming Voice-over-IP call on it, using a software application running on the TAS-Proxy 3, as to whether the call concerned is destined for an emergency call telephone number. The TAS-Proxy 3 transfers calls recognized as emergency calls to the emergency call application 4 for further processing while the TAS-Proxy 3 directly routes all other calls directly according to their respective destinations (see step 55 of FIG. 3). For this, the TAS-Proxy 3 compares the incoming Voice-over-IP calls with entries in a database 9 maintained on or accessible by the TAS-Proxy 3 for this purpose (see step 54 of FIG. 3).

A feature of the present invention is the highly available replication database 5, which is a database that may be replicated several times and the replicated databases may be kept on several distributed redundant systems showing high reliability. The database 5 includes a software application which does not include the routing information received from the Internet access systems for the technical data for the IP address belonging to the location of the caller and may access this routing information with reference to the IP address. The emergency call data are transmitted to an emergency call application 4 requesting the routing information by means of this software based on rules using a replication of the system holding the database 5. The Emergency ID which codes this information is generated by the software included on the replication database 5. The local, responsible Public Safety Answering Point 2 for an incoming telephone emergency call may request the required location information from the subscriber making the emergency telephone call to it. However, in the case due to possible technical connection faults, it is no longer possible to request this information from the subscriber, or the subscriber making the emergency telephone call to the responsible Public Safety Answering Point 2 is no longer contactable, and the method according to the present invention may be used. Different possibilities can be envisaged according to the method of the present invention, such as the Public Safety Answering Point 2 receiving the location information needed by it using the Emergency ID transmitted to it with the emergency telephone call.

In one embodiment, the Public Safety Answering Point 2 requests the location information from a central control centre service such as already exists today (for example, in the landline network of Deutsche Telekom). The Public Safety Answering Point 2 contacts the replication database 5 not using corresponding systems itself but instead contacts the central control centre service appropriately equipped for this. The control centre service then requests the technical data describing the location such as NAS port, Slot, VPI and VPC using the modified Network Provided telephone number (i.e., the Emergency ID) transmitted to the control centre service from the Public Safety Answering Point 2. The control centre service accesses an operations database of the Voice-over-IP provider with the technical data received from the replication database, and returns the location information or address data resulting from this to the Public Safety Answering Point 2.

An emergency call system operating according to the present invention handles emergency telephone calls using IP-based telephony comprising subscriber connections with a Voice-over-IP access, at least one Telephony Application Server or TAS-Proxy, and a plurality of Public Safety Answering Points integrated in the public telephone network. Thereby, IP-based telephone calls are each routed from the TAS-Proxy 3 via a Media Gateway 8 to subscriber connections in the public telephone network whereby an IP-based emergency telephone call is routed to the local, responsible Public Safety Answering Point 2 for this emergency telephone call. According to the present invention, an entity is connected between the TAS-Proxy 3 and the local, responsible Public Safety Answering Point 2 for this emergency telephone call using the Media Gateway 8, making it accessible via IP-based telephone calls to which the TAS-Proxy 3 transfers the emergency telephone call stating the IP address of the Voice-over-IP subscriber making the emergency telephone call and from which the TAS-Proxy 3 receives corresponding emergency call data for the IP address concerned. The emergency call data comprise the telephone number of the local Public Safety Answering Point responsible for the emergency telephone call, the transparently transmitted User Provided telephone number of the Voice-over-IP subscriber 1 making the call, and the modified Network Provide telephone number (i.e., Emergency ID).

The Emergency ID comprises a reference to the technical data for the location and a prefix to the modified Network Provided telephone number as such an identifying reference. The additional entity according to the present invention comprises an emergency call application 4 and a highly available replication database 5 accessible from this emergency call application 4 for requesting the emergency call data returned to the TAS-Proxy 4 from the call application 4. The highly available replication database 5 whose replications may be kept decentralized on distributed systems is designed in hardware and software for obtaining the emergency data and the technical data for the location of the caller linked to this from Internet access systems. The above mentioned access systems may be ADSL and ATM-NI servers, Inventory Servers for recording and inventory of hardware and software information of accesses to and via Gbit Ethernet networks and Order Management System servers.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for localizing an initial point of an Internet Protocol (IP)-based telephone call, said method comprising:
   receiving, by a Telephony Application Server (TAS)-Proxy, the IP-based telephone call originating from a Voice-over-IP (VoIP) subscriber, said IP-based telephone call characterized by an IP address of the VoIP subscriber and by a called telephone number of an entity being called;
   ascertaining, by the TAS-Proxy, that the IP-based telephone call is an emergency call;
   by an emergency call application in response to said ascertaining, transmitting to a replication database a request for emergency call data configured to be used for identifying an initial point of the emergency call, said request comprising the IP address;
   by a software application comprised by the replication database in response to the replication database having received the transmitted request, determining the emergency call data from the IP address followed by transmitting the emergency call data to the emergency call application, said emergency call data identifying a local responsible Public Safety Answering Point and comprising an Emergency ID that includes a reference to technical data that can be used to locate the initial point of the emergency call;
   by the emergency call application in response to having received the transmitted emergency call data, sending the emergency call data to the TAS-Proxy;
   by the TAS-Proxy in response to having received the emergency call data sent by the emergency call application, routing the IP-based emergency call to the local responsible Public Safety Answering Point and transmitting the Emergency ID to the local responsible Public Safety Answering Point for enabling the local responsible Public Safety Answering Point to locate the initial point of the emergency call;
   by the Public Safety Answering Point forwarding the Emergency ID to a control centre Service;
   by the control centre service retrieving the technical data from the replication database as a function of the Emergency ID and then using the retrieved technical data to receive access to an actual address of the VoIP subscriber and to further receive access to an other information identifying the VoIP subscriber, where the actual address and the other information may be accessed from an operations database;
   by the control centre service accessing the actual address of the VoIP subscriber and the other information identifying the VoIP subscriber from the operations database; and
   by the control centre service transmitting the actual address of the VoIP subscriber and the other information identifying the VoIP subscriber to the Public Safety Answering Point,
   wherein the emergency call data is replicated at a plurality of locations which are separated from the replication database, and wherein said transmitting the emergency call data to the emergency call application comprises transmitting the emergency call data from a one location of the plurality of locations to the emergency call application.

2. The method of claim 1, wherein the Emergency ID further comprises a prefix to the reference to the technical data, and wherein the prefix denotes that the Emergency ID is for locating the initial point of the emergency call.

3. The method of claim 2, wherein the Emergency ID is a telephone number, and wherein the prefix has a form of an area code exclusively reserved for identifying caller localization for emergency phone calls.

4. The method of claim 1, wherein the technical data comprises routing information pertaining to link components directly linked with the initial point of the IP-based emergency call, and wherein the link components include a Network Access Services (NAS) port on an access server and an associated slot, a Virtual Path Identifier (VPI) identifying a virtual path used, and a Virtual Channel Identifier (VCI) identifying a virtual channel used.

5. The method of claim 4, wherein the method further comprises:
   prior to said determining the emergency call data, receiving the routing information by the replication database via channels to Internet access systems comprising an Asymmetric Digital Subscriber Line (ADSL), Asynchronous Transfer Mode (ATM)-NI servers, servers for Gbit Ethernet connections, and IP servers of order management systems and associated Message Queue-Servers.

6. The method of claim 1, wherein the request further comprises a user provided telephone number of the VoIP subscriber.

7. The method of claim 6, wherein the emergency call data further includes a telephone number of the local responsible Public Safety Answering Point and the user provided telephone number of the VoIP subscriber.

8. The method of claim 1, wherein said ascertaining comprises:
   determining, by the TAS-Proxy, from emergency telephone number entries in a database to which the TAS-Proxy is coupled, that the called telephone number matches an emergency telephone number entry of the emergency telephone number entries; and
   responsive to said determining that the called telephone number matches said emergency telephone number entry, concluding that the IP-based call is an emergency call.

9. The method of claim 1, wherein the emergency call data and the technical data do not identify the VoIP subscriber.

10. An emergency call system comprising a Telephony Application Server (TAS)-Proxy, an emergency call application, and a replication database, said system configured to perform a method for localizing an initial point of an Internet Protocol (IP)-based telephone call, said method comprising:
   receiving, by a Telephony Application Server (TAS)-Proxy, the IP-based telephone call originating from a Voice-over-IP (VoIP) subscriber, said IP-based telephone call characterized by an IP address of the VoIP subscriber and by a called telephone number of an entity being called;
   ascertaining, by the TAS-Proxy, that the IP-based telephone call is an emergency call;
   by an emergency call application in response to said ascertaining, transmitting to a replication database a request for emergency call data configured to be used for identifying an initial point of the emergency call, said request comprising the IP address;
   by a software application comprised by the replication database in response to the replication database having received the transmitted request, determining the emergency call data from the IP address followed by transmitting the emergency call data to the emergency call application, said emergency call data identifying a local responsible Public Safety Answering Point and comprising an Emergency ID that includes a reference to technical data that can be used to locate the initial point of the emergency call;
   by the emergency call application in response to having received the transmitted emergency call data, sending the emergency call data to the TAS-Proxy;
   by the TAS-Proxy in response to having received the emergency call data sent by the emergency call application, routing the IP-based emergency call to the local responsible Public Safety Answering Point and transmitting the Emergency ID to the local responsible Public Safety Answering Point for enabling the local responsible Public Safety Answering Point to locate the initial point of the emergency call;
   by the Public Safety Answering Point forwarding the Emergency ID to a control centre service;
   by the control centre service retrieving the technical data from the replication database as a function of the Emergency ID and then using the retrieved technical data to receive access to an actual address of the VoIP subscriber and to further receive access to an other information identifying the VoIP subscriber, where the actual address and the other information may be accessed from an operations database;
   by the control centre service accessing the actual address of the VoIP subscriber and the other information identifying the VoIP subscriber from the operations database; and
   by the control centre service transmitting the actual address of the VoIP subscriber and the other information identifying the VoIP subscriber to the Public Safety Answering Point,
   wherein the emergency call data is replicated at a plurality of locations which are separated from the replication database, and wherein said transmitting the emergency call data to the emergency call application comprises transmitting the emergency call data from a one location of the plurality of locations to the emergency call application.

11. The system of claim 10, wherein the Emergency ID further comprises a prefix to the reference to the technical data, and wherein the prefix denotes that the Emergency ID is for locating the initial point of the emergency call.

12. The system of claim 11, wherein the Emergency ID is a telephone number, and wherein the prefix has a form of an area code exclusively reserved for identifying caller localization for emergency phone calls.

13. The system of claim 10, wherein the technical data comprises routing information pertaining to link components directly linked with the initial point of the IP-based emergency call, and wherein the link components include a Network Access Services (NAS) port on an access server and an associated slot, a Virtual Path Identifier (VPI) identifying a virtual path used, and a Virtual Channel Identifier (VCI) identifying a virtual channel used.

14. The system of claim 13, wherein the method further comprises:
   prior to said determining the emergency call data, receiving the routing information by the replication database via channels to Internet access systems comprising an Asymmetric Digital Subscriber Line (ADSL), Asynchronous Transfer Mode (ATM)-NI servers, servers for Gbit Ethernet connections, and IP servers of order management systems and associated Message Queue-Servers.

15. The system of claim 10, wherein the request further comprises a user provided telephone number of the VoIP subscriber.

16. The system of claim 15, wherein the emergency call data further includes a telephone number of the local responsible Public Safety Answering Point and the user provided telephone number of the VoIP subscriber.

17. The system of claim 10, wherein said ascertaining comprises:
   determining, by the TAS-Proxy, from emergency telephone number entries in a database to which the TAS-Proxy is coupled, that the called telephone number matches an emergency telephone number entry of the emergency telephone number entries; and responsive to said determining that the called telephone number matches said emergency telephone number entry, concluding that the IP-based call is an emergency call.

18. The system of claim 10, wherein the emergency call data and the technical data do not identify the VoIP subscriber.

* * * * *